US012781907B2

(12) United States Patent
Robertson et al.

(10) Patent No.: US 12,781,907 B2
(45) Date of Patent: Nov. 3, 2026

(54) PIPELINE PASSAGE INDICATOR

(71) Applicant: Stark Solutions, LLC, Conroe, TX (US)

(72) Inventors: Jarrod S. Robertson, Montgomery, TX (US); Morgan M. Sledd, Conroe, TX (US); Andreas R. Segert, Conroe, TX (US)

(73) Assignee: Startk Solutions, LLC, Conroe, TN (US)

( * ) Notice: Subject to any disclaimer, the term of this patent is extended or adjusted under 35 U.S.C. 154(b) by 397 days.

(21) Appl. No.: 18/593,977

(22) Filed: Mar. 3, 2024

(65) Prior Publication Data

US 2025/0277556 A1 Sep. 4, 2025

(51) Int. Cl.
*F16L 55/48* (2006.01)

(52) U.S. Cl.
CPC .................................... *F16L 55/48* (2013.01)

(58) Field of Classification Search
CPC . F16L 55/48; F16L 55/38; F16L 55/40; F16L 55/46; F16L 2101/12; F16L 55/26; F16L 55/30
USPC .......... 116/209; 73/865.8, 866.5, 865.9, 592, 73/49.1, 700
See application file for complete search history.

(56) References Cited

U.S. PATENT DOCUMENTS 5,263,220 A * 11/1993 Campbell ............... B08B 9/055 15/104.063
2008/0276859 A1* 11/2008 Rankin ................... B08B 9/055 116/303
2014/0123416 A1* 5/2014 Klemm ................... B08B 9/027 277/628
2021/0296970 A1* 9/2021 Crane .................... H02K 15/00

* cited by examiner

*Primary Examiner* — Kristina M Deherrera
*Assistant Examiner* — Evan Mancini
(74) *Attorney, Agent, or Firm* — Quisenberry Law PLLC; C. Dale Quisenberry

(57) ABSTRACT

Pipeline passage indicators for signaling the presence of a pig in a pipeline are disclosed. A pipeline passage indicator may house an upper magnet and a lower magnet in separate bores within the pipeline passage indicator. A flag attached to an upper end of the pipeline passage indicator is moveable from a first position to a second position in response to upward movement of the upper magnet. A labyrinth member defining a circuitous flow path is moveable from a first position to a second position in response to movement of a trigger from a first position to a second position. Movement of the labyrinth member will cause the lower magnet to move from its first position to its second position, which will cause the upper magnet to move from its first position to its second position and thereby move the flag from its first position to its second position.

17 Claims, 7 Drawing Sheets

FIG. 5
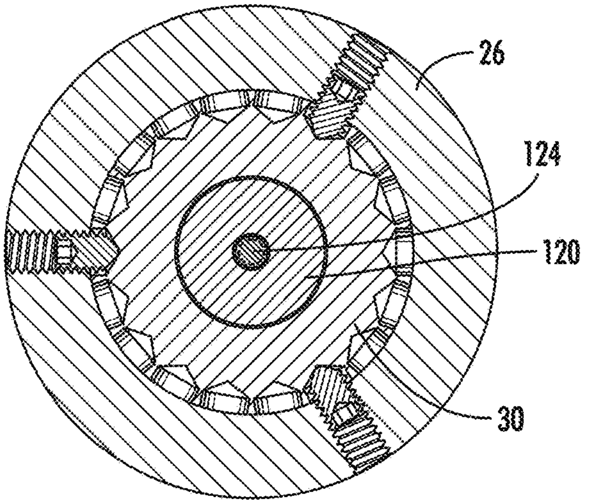
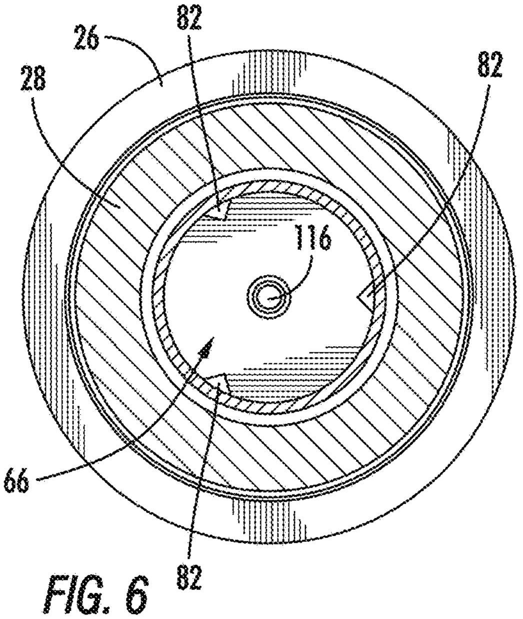
FIG. 6
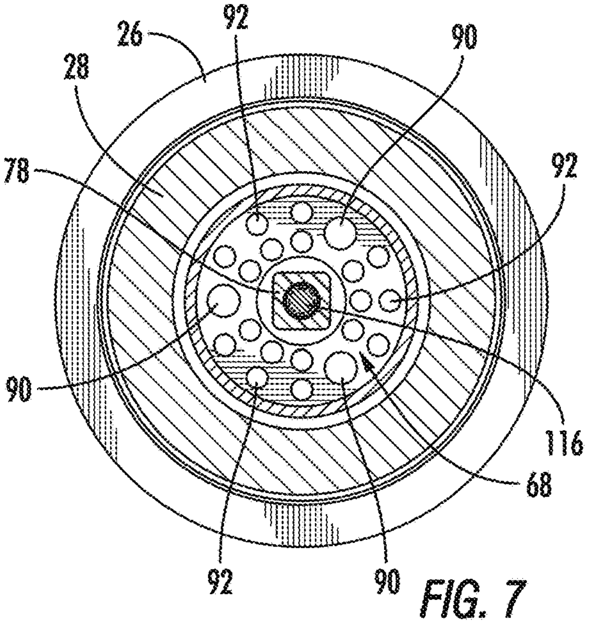
FIG. 7
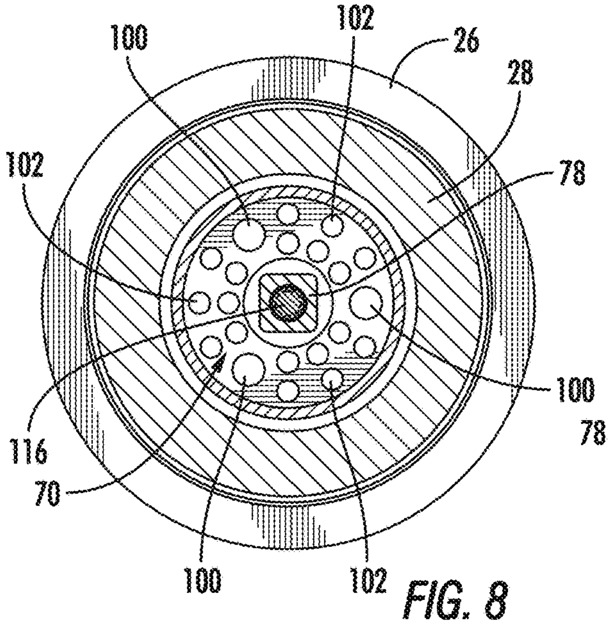
FIG. 8
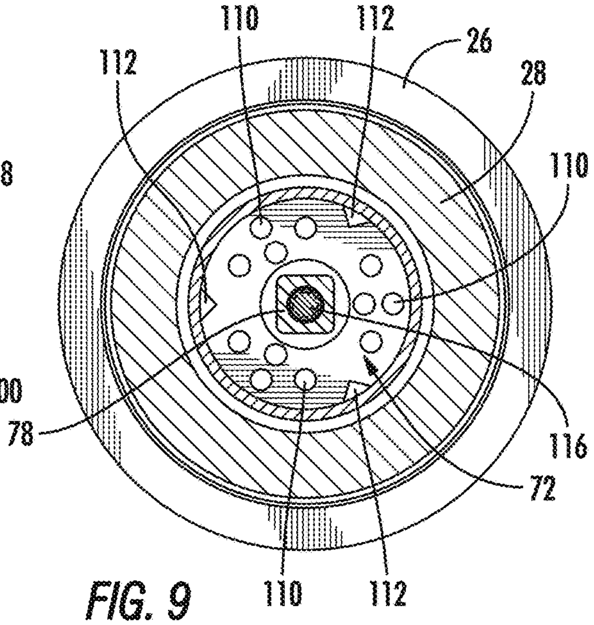
FIG. 9

PIPELINE PASSAGE INDICATOR

BACKGROUND OF THE INVENTIONS

1. Field of the Inventions

The present inventions generally pertain to oil and gas pipelines, and more particularly to devices for use in connection with pig cleaners and tools that are used to clean and inspect pipelines.

2. Description of the Related Art

It is well known in the oil and gas industry that devices known as "pigs" are used to clean and inspect the interior of oil and gas pipelines. Pigs are placed inside the pipeline and then moved along the interior of the pipeline to clean the interior of the pipeline. A pig is inserted into a pipeline by first placing the pig into a chamber (sometimes referred to as a "launcher") formed from a relatively short section of pipeline at an entry end of the pipeline. The chamber has an outer door and a valve, which is exposed to pressurized fluid within the pipeline to be cleaned. To insert the pig, the valve is closed to seal the chamber, and then the pig is inserted into the chamber between the outer door and the valve. Next, the valve is opened, which will cause the chamber to be filled with pressurized fluid from the pipeline. The pig is then moved into and along the pipeline to clean or inspect the pipeline. The pig will traverse the section of the pipeline to be cleaned or inspected, and eventually arrive at its destination, sometimes referred to as a "receiver" chamber where the pig is captured and removed from the pipeline.

It is important for the pig operator to know when the pig has passed key locations of the pipeline, such as when it arrives at the "receiver" chamber. It is well known within the oil and gas industry to provide what is known in the industry as a "pig signal" (referred to herein as a pipeline passage indicator) in the wall of the pipeline or launcher/receiver chamber to alert the pig operator when the pig has passed by a particular location. In simple terms, the pipeline passage indicator includes a trigger extending into the pipeline and within the path of the pig. When the pig passes the location of the pipeline passage indicator and hits the trigger, the trigger pushes a first or lower magnet up, which then pushes a second or upper magnet up, which causes a flag to move to an up position to indicate to the pig operator that the pig has passed that location. The top surface of the first or lower magnet and the bottom surface of the second or upper magnet have the same polarity. As such, when the lower magnet moves up into sufficiently close proximity to the upper magnet, the lower magnet will cause the upper magnet to move upwardly without touching it. The lower magnet is in a lower bore within the pipeline passage indicator, and the upper magnet is in an upper bore within the pipeline passage indicator. The upper and lower bores are separated from each other by an inner wall. As such, the two magnets are separated from each other by the inner wall, which has been designed to still allow the force of the lower magnet to push against the force of the upper magnet, when moved into close proximity of each other.

The lower bore is exposed to the chamber and to the pressurized fluids in the pipeline (and to fine debris entrained within the pressurized fluid) when that portion of the pipeline is pressurized. Because the lower magnet is in the lower bore, the lower magnet is likewise exposed to the pressurized fluid and debris within the pipeline. It is known within the industry that it is desirous to design pipeline passage indicators so as to minimize the amount of debris that can come into contact with and foul the lower magnet. If too much debris is allowed to cover the lower magnet, then the lower magnet will potentially no longer function for its purpose of pushing the upper magnet upwardly.

As will become apparent from the description and explanation set forth below, the present inventions address the above-described objective by providing new and improved pipeline passage indicators with new and improved designs to minimize the amount of debris that is allowed to come into contact with the lower magnet.

SUMMARY OF THE INVENTIONS

In one aspect, the present inventions may include a pipeline passage indicator comprising: a body member including an upper internal bore and a lower internal bore; a flag attached to an upper end of the body member and moveable between a first position and a second position; an upper magnet disposed within the upper internal bore for movement between a first position and a second position; a lower magnet disposed within the lower internal bore for movement between a first position and a second position; a labyrinth member defining a circuitous flow path from a first end of the labyrinth member to a second end of the labyrinth member, and moveable between a first position and a second position; and a trigger disposed adjacent the first end of the labyrinth member and moveable between a first position and a second position. Another feature of this aspect of the present inventions may be that the labyrinth member includes a base member, a center disk, and a magnet holder, the lower magnet being at least partially positioned in a magnet bore in the magnet holder. Another feature of this aspect of the present inventions may be that the base member includes a support plate and a central stem, and the center disk includes a disk body member and a spacer extension extending from the disk body member, the spacer extension having a lower surface in contact with an upper surface of the support plate to define a flow space. Another feature of this aspect of the present inventions may be that the disk body member includes at least one flow aperture therethrough. Another feature of this aspect of the present inventions may be that the disk body member includes at least one pocket in a lower surface of the disk body member. Another feature of this aspect of the present inventions may be that the magnet holder includes a magnet body member, a lower surface of the magnet body member including at least one pocket disposed therein. Another feature of this aspect of the present inventions may be that the center disk includes a central passageway extending therethrough, and the magnet holder includes a central passageway extending therethrough, the central stem mating with and extending through the central passageway in the center disk and the central passageway in the magnet holder. Another feature of this aspect of the present inventions may be that the base member includes a support plate having an outer surface, the outer surface of the support plate including at least one groove, the center disk having a disk body member, the disk body member including at least one flow aperture therethrough, the at least one flow aperture being offset from the at least one groove.

In another aspect, the present inventions may include a pipeline passage indicator comprising: a body member including an upper internal bore, a lower internal bore, and an internal wall, the internal wall being disposed between the upper internal bore and the lower internal bore; a flag attached to an upper end of the body member and moveable between a first position and a second position; an upper magnet disposed within the upper internal bore for movement between a first position and a second position; a lower magnet disposed within the lower internal bore for movement between a first position and a second position; a base member disposed in the lower internal bore and including a central stem and a flow path; a center disk disposed in the lower internal bore, engaged with the central stem on the base member, and having a flow aperture offset from the flow path in the base member; a magnet holder disposed in the lower internal bore and engaged with the central stem on the base member, the lower magnet being at least partially positioned in a magnet bore in the magnet holder, the magnet holder including a flow path offset from the flow aperture in the center disk; and a trigger disposed adjacent the base member, and moveable between a first position and a second position. Another feature of this aspect of the present inventions may be that the base member further includes a support plate, and the center disk includes a disk body member and a spacer extension extending from the disk body member, the spacer extension having a lower surface in contact with an upper surface of the support plate to define a flow space. Another feature of this aspect of the present inventions may be that a lower surface of the center disk includes at least one pocket. Another feature of this aspect of the present inventions may be that the magnet holder includes a magnet body member, a lower surface of the magnet body member including at least one pocket disposed therein. Another feature of this aspect of the present inventions may be that the center disk includes a central passageway extending therethrough, and the magnet holder includes a central passageway extending therethrough, the central stem on the base member mating with and extending through the central passageway in the center disk and the central passageway in the magnet holder. Another feature of this aspect of the present inventions may be that the base member includes a support plate having an outer surface, the outer surface of the support plate including at least one groove, the center disk having a disk body member, the disk body member including at least one flow aperture therethrough, the at least one flow aperture being offset from the at least one groove.

In another aspect, the present inventions may include a pipeline passage indicator comprising: a body member including an upper internal bore, a lower internal bore, and an internal wall, the internal wall being disposed between the upper internal bore and the lower internal bore; a flag attached to an upper end of the body member and moveable between a first position and a second position; an upper magnet disposed within the upper internal bore for movement between a first position and a second position; a lower magnet disposed within the lower internal bore for movement between a first position and a second position; a base member disposed in the lower internal bore and including a central stem and a support plate, the support plate having an outer surface, the outer surface on the support plate including at least one groove; a center disk disposed in the lower internal bore, engaged with the central stem on the base member, and having at least one flow aperture therethrough, the at least one flow aperture being offset from the at least one groove in the outer surface of the support plate; a magnet holder disposed in the lower internal bore and including a magnet body member and engaged with the central stem on the base member, the magnet body member having an outer surface including at least one groove, the at least one groove being offset from the at least one aperture in the center disk, the lower magnet being at least partially positioned in a magnet bore in the magnet body member; and a trigger disposed adjacent the base member, and moveable between a first position and a second position. Another feature of this aspect of the present inventions may be that the center disk includes a disk body member and a spacer extension extending from the disk body member, the spacer extension having a lower surface in contact with an upper surface of the support plate of the base member to define a flow space between the base member and the center disk. Another feature of this aspect of the present inventions may be that a lower surface of the center disk includes at least one pocket. Another feature of this aspect of the present inventions may be that a lower surface of the magnet body member includes at least one pocket disposed therein. Another feature of this aspect of the present inventions may be that the center disk includes a central passageway extending therethrough, and the magnet holder includes a central passageway extending therethrough, the central stem on the base member mating with and extending through the central passageway in the center disk and the central passageway in the magnet holder, and the base member, center disk, and magnet holder are connected to each other. Another feature of this aspect of the present inventions may be that the central stem on the base member has a square cross section, the central passageway of the center disk has square cross section configured to matingly engage with the central stem, and the central passageway of the magnet holder has a square cross section configured to matingly engage with the central stem.

Other features, aspects and advantages of the present inventions will become apparent from the following discussion and detailed description.

BRIEF DESCRIPTION OF THE DRAWINGS

FIG. 4A is an enlarged view of the indicated portion of FIG. 4.

FIG. 5 is a cross-sectional view taken along lines 5-5 of FIG. 3.

FIG. 6 is a cross-sectional view taken along lines 6-6 of FIG. 3.

FIG. 7 is a cross-sectional view taken along lines 7-7 of FIG. 3.

FIG. 8 is a cross-sectional view taken along lines 8-8 of FIG. 3.

FIG. 9 is a cross-sectional view taken along lines 9-9 of FIG. 3.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Figure 1:
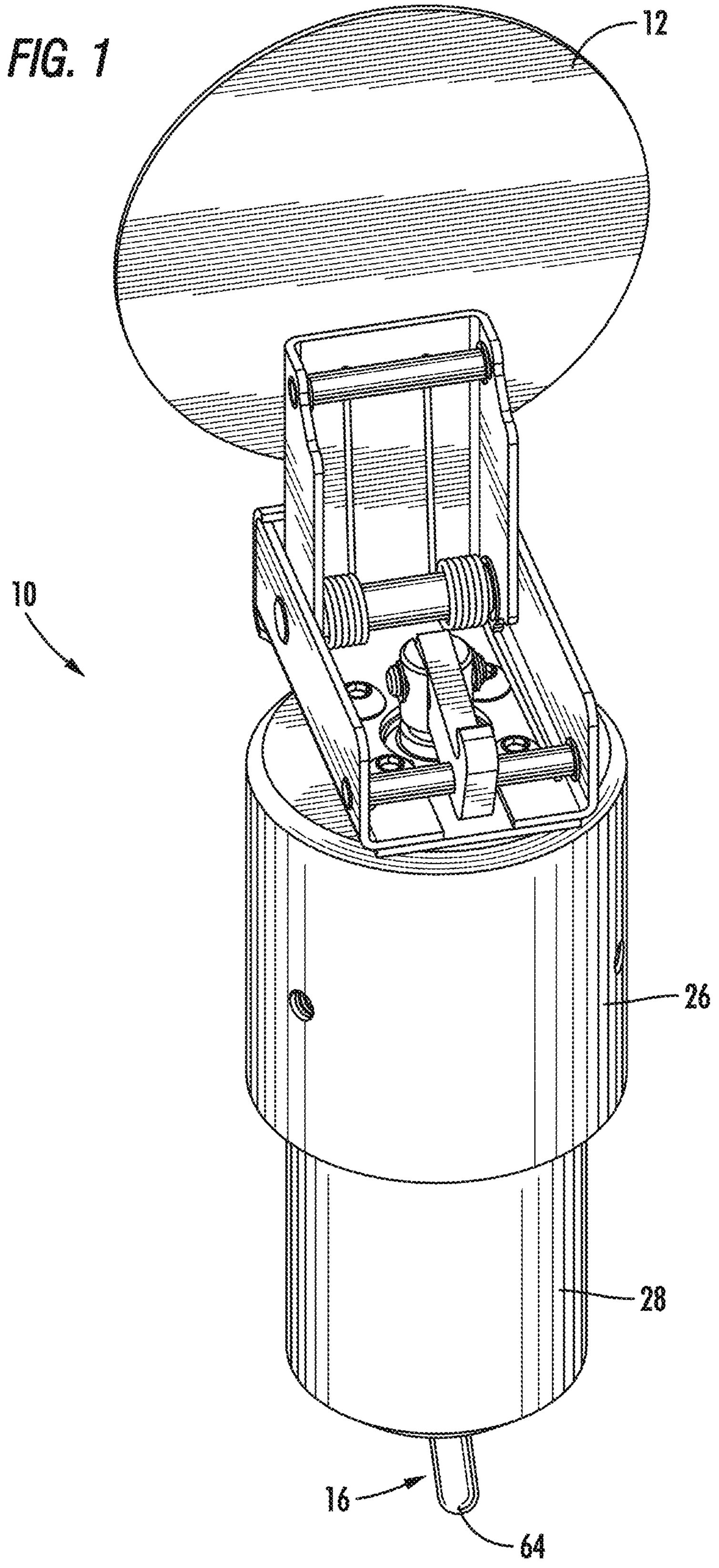
FIG. 1 is a perspective view a specific embodiment of a pipeline passage indicator constructed in accordance with the present inventions and shown with a flag indicator in a deployed position.
Figure 2:
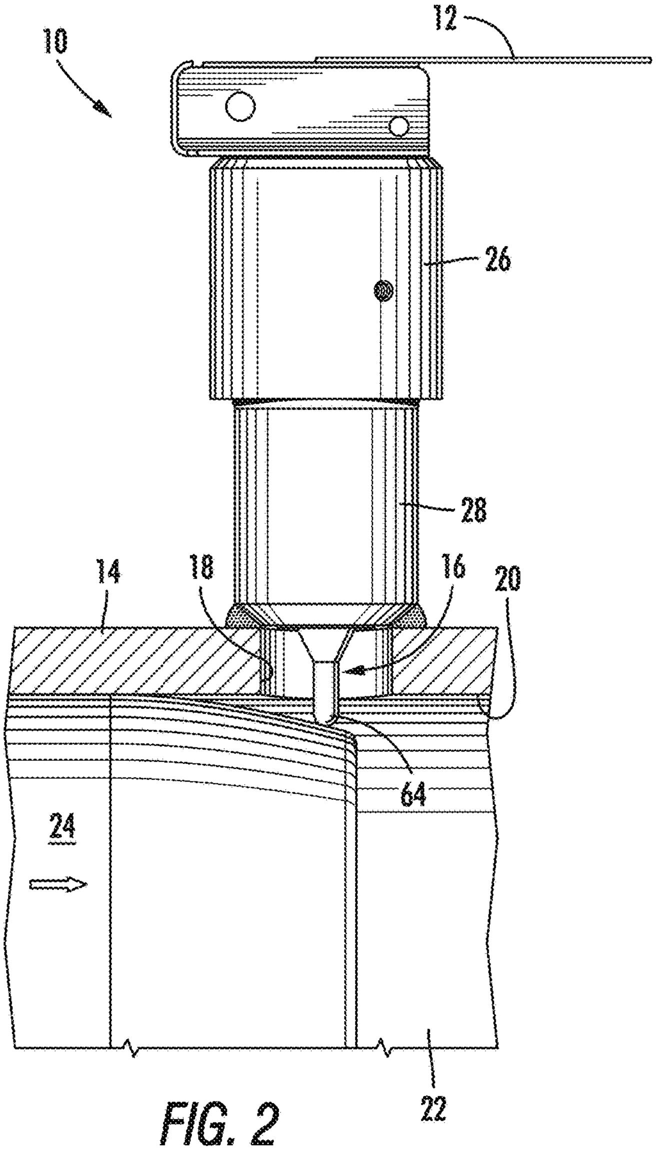
FIG. 2 is a side view of the pipeline passage indicator shown in FIG. 1 installed in the side wall of a section of pipeline with the flag indicator in a first or non-deployed position, and with an approaching pig in the pipeline and coming into initial contact with a trigger of the pipeline passage indicator, but before moving the trigger from a first or non-deflected position to a second or deflected position to cause the flag indicator to be moved into its second or deployed position.
Figure 2A:
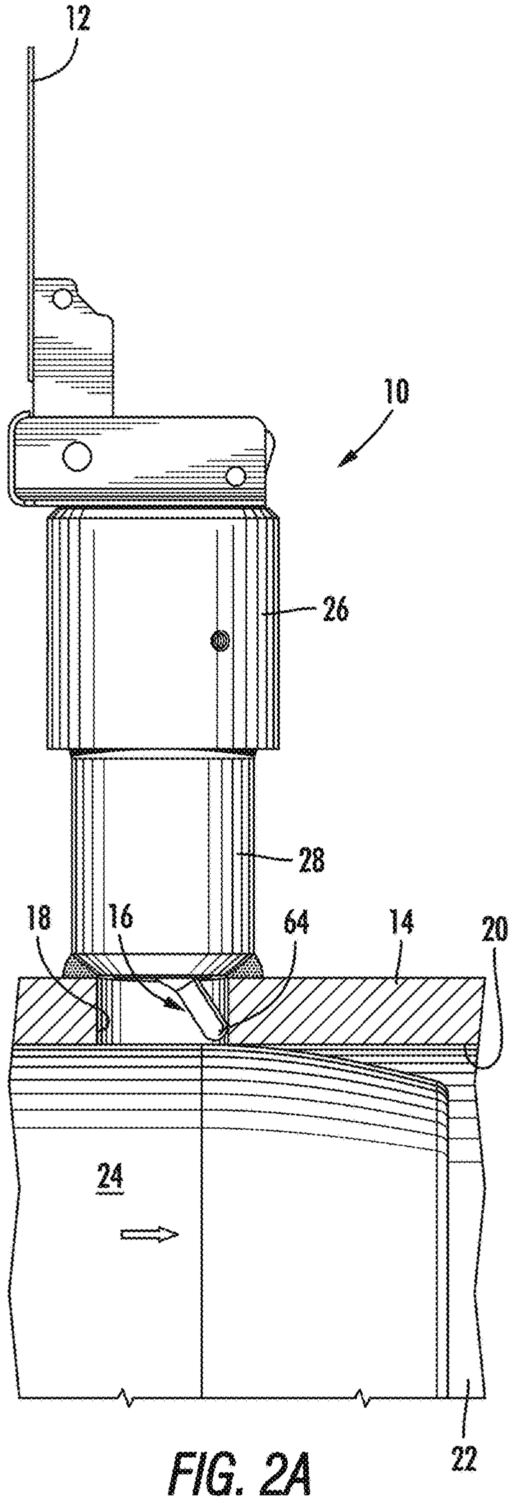
FIG. 2A is a side view very similar to FIG. 2, except that the pig has now moved past the trigger and moved the trigger into its second or deflected position to cause the flag indicator to move into its second or deployed position.

Referring to the drawings in detail, wherein like numerals denote identical elements throughout the several views, and referring initially to FIG. 1, there is shown a perspective view of a specific embodiment of a pipeline passage indicator 10 having a flag 12 shown in its second or deployed position. Referring now to FIG. 2, the pipeline passage indicator 10 is shown installed in a sidewall 14 of a pipeline. The pipeline passage indicator 10 includes a trigger 16 extending downwardly through an aperture 18 in the sidewall 14 and into an inner bore 20 of a pipeline 22. In FIG. 2, the pipeline passage indicator 10 is shown in a first or non-deployed position, with the flag 12 in a first, non-deployed or horizontal position, and with the trigger 16 in its first or non-deflected position. FIG. 2 shows a pig 24 within the pipeline 22 at the point it makes initial contact with the trigger 16. Referring now to FIG. 2A, the pig 24 is shown after it has made contact with the trigger 16, which has caused the trigger 16 to move to its second or deflected position, which has caused the flag 12 to move to its second or deployed position.

Figure 3:
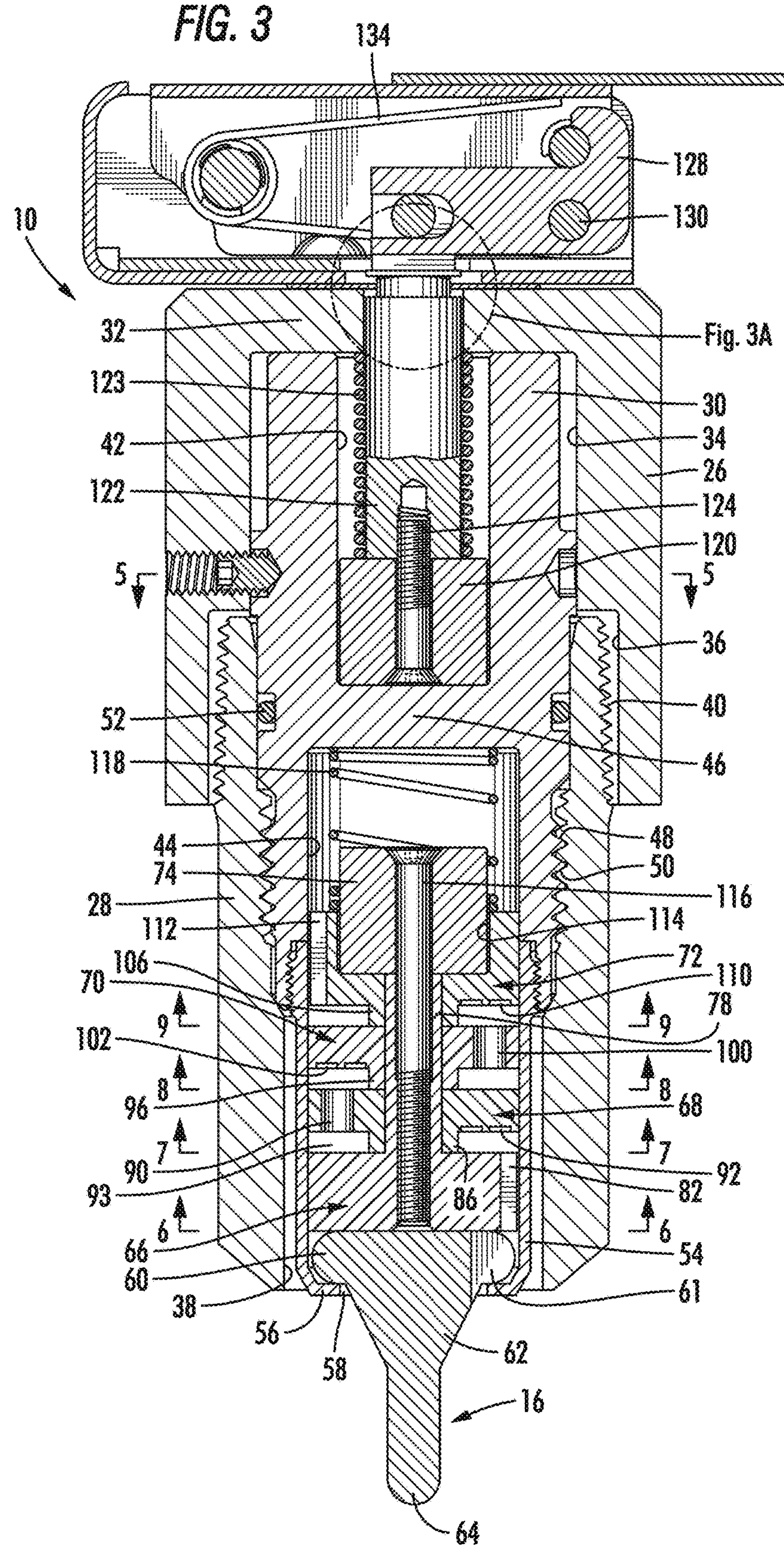
FIG. 3 is a cross-sectional view of the pipeline passage indicator shown in FIGS. 1, 2 and 2A with the pipeline passage indicator in a first or non-deployed position.
Figure 3A:
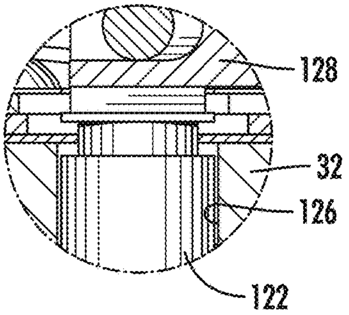
FIG. 3A is an enlarged view of the indicated portion of FIG. 3.

Referring now to FIG. 3, a cross-sectional view of the pipeline passage indicator 10 is shown with the flag 12 in its first or non-deployed position and the trigger 16 in its first or non-deflected position. The pipeline passage indicator 10 may include an upper housing 26, a lower housing 28, and an inner body member 30, each of which may be cylindrical in shape in a specific embodiment. The upper housing 26 may include an enclosed upper end 32 and an inner bore 34. A lower surface of the inner bore 34 may be provided with a recess 36. The lower housing 28 has an inner bore 38. An outer surface of an upper end of the lower housing 28 may include threads 40 disposed adjacent the recess 36. The inner body member 30 may include an upper bore 42, a lower bore 44, and an inner wall 46. The upper bore 42 extends downwardly from an upper end of the inner body member 30 and has a lower surface corresponding to an upper surface of the inner wall 46. The lower bore 44 extends upwardly from a lower end of the inner body member 30 and has an upper surface corresponding to a lower surface of the inner wall 46.

The upper end of the inner body member 30 may be disposed within the inner bore 34 of the upper housing 26, and may be in contact with a lower surface of the enclosed upper end 32 of the upper housing 26. An outer surface of the lower end of the inner body member 30 may include threads 48 adapted for threadable engagement with threads 50 disposed in the inner bore 38 of the lower housing 28. A seal 52 (such as an annular seal) is positioned in a recess around an outer surface of the inner body member 30 and in sealing contact with the inner bore 38 of the lower housing 28 at a location above the mating threads 48 and 50. In this manner, a sealed space is defined within the inner bore 38 of the lower housing 28 below the seal 52. In this manner, pressurized fluid within the pipeline cannot move upwardly within the pipeline passage indicator 10 past the seal 52. Some or all of the upper housing 26, lower housing 28, and inner body member 30 may be provided as a unitary structures as opposed to individual components.

Referring now to the lower end of the pipeline passage indicator 10, the components contained within the pipeline passage indicator 10 within the sealed space below the seal 52 will now be discussed and described. More precisely, the components to be described now are situated within the inner bore 44 of the inner body member 30. In a specific embodiment, it is noted that the lower end of the inner body member 30 may be provided with an extension member 54 that may be threadably attached to the inner body member 30 to effectively extend the inner bore 44 roughly down to a lower end of the lower housing 28. The extension member 54 may also be integrally formed as part of the inner body member 30. The inner bore 44 may have a lower enclosed end 56 (which may be part of the extension member 54). The lower enclosed end 56 may include a trigger aperture 58 through which the trigger 16 may extend and be retained. The trigger 16 may include a head 60, an angled transition section 62, and a tip 64. The trigger head 60 may include a plurality of flow recesses 61, the purpose of which is to facilitate upward flow of pressurized fluid from the pipeline and past the trigger 16. When in its first or non-deflected position as shown in FIG. 3, a lower surface of the trigger head 60 may be resting against and retained by an upper surface of the lower enclosed end 56 of the bore 44, with the trigger tip 64 in a generally vertical orientation.

Figure 10:
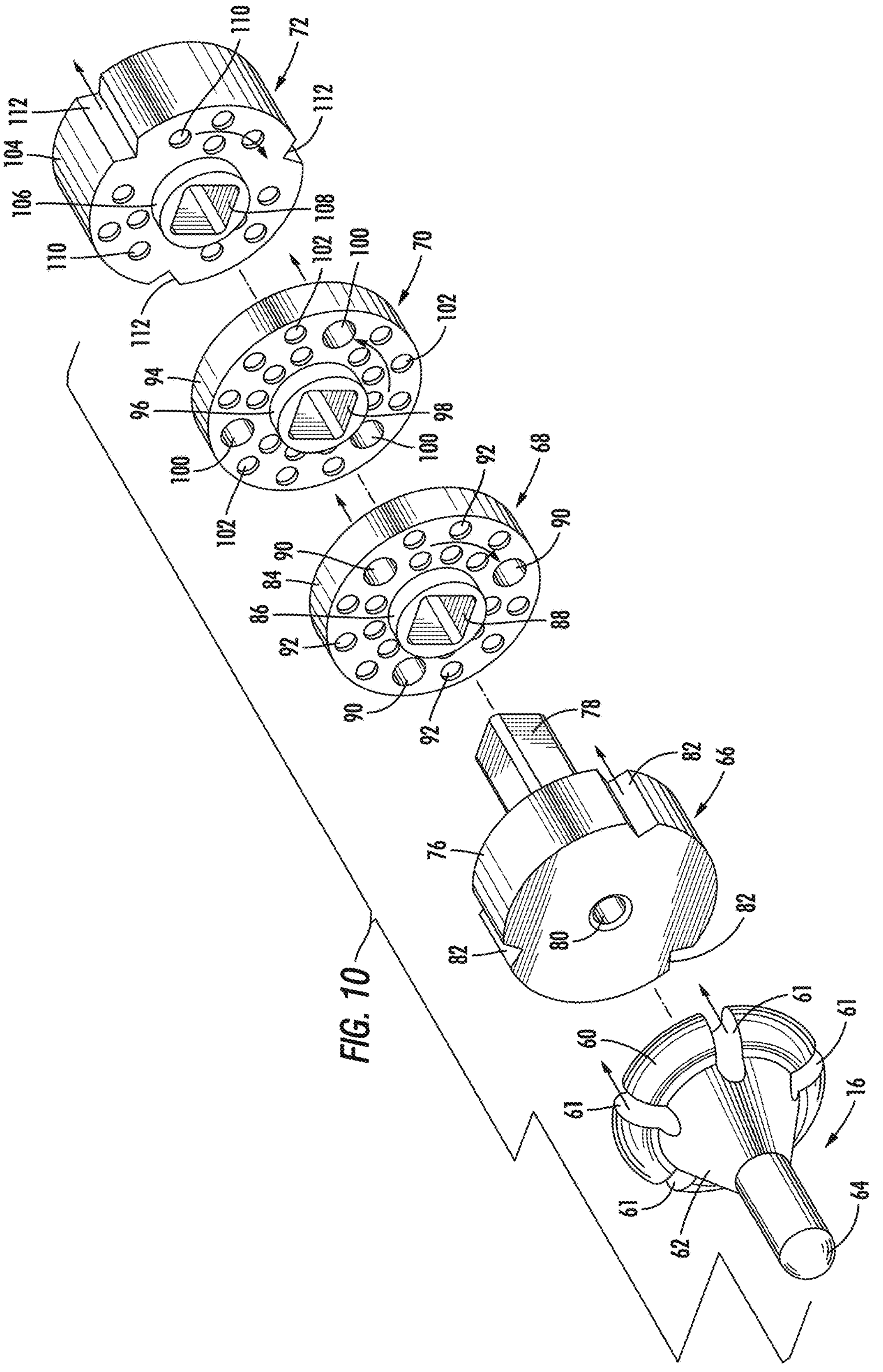
FIG. 10 is an exploded view showing a group of internal components of the pipeline passage indicator shown in FIGS. 3 and 4.

A labyrinth member, which may be an assembly of components or a unitary structure, is positioned above the trigger head 60 and within the lower bore 44 of the inner body member 30. Referring now to FIGS. 3 and 10, in a specific embodiment, and starting at the bottom, the labyrinth member may include a base member 66, a first center disk 68, a second center disk 70, a magnet retainer 72, and a first or lower magnet 74. In a specific embodiment, the labyrinth member may include only one of the center disks 68 and 70. In another specific embodiment, the labyrinth member may include more than two center disks 68 and 70. In a specific embodiment, the base member 66 may include a support plate 76. In another specific embodiment, the base member 66 may include a central stem 78 extending upwardly from a center of the support plate 76. The support plate 76 may have a circular cross section. The central stem 78 may have a square or rectangular cross section. A central bore 80 extends upwardly through the center of the support plate 76 and through the center of the central stem 78. A lower section of the central bore 80 may be threaded, as can be seen, for example, in FIG. 3. An outer surface of the support plate 76 may include one or more grooves 82 to act as fluid flow paths, as will be discussed further hereinbelow. In a specific embodiment, the support plate 78 may include three grooves 82, and the grooves 82 may be in the shape of angular notches. In another specific embodiment, the support plate 76 may include one or more flow apertures through the body of the support plate 76 to act as flow paths instead of including grooves on the outside of the support plate 76.

Moving upwardly now to the next component, the first center disk 68 may include a disk body member 84 and a spacer extension 86 extending downwardly from the disk body member 84. In a specific embodiment, each of the disk body member 84 and the spacer extension 86 may have a circular cross section. The disk body member 84 and the spacer extension 86 may include a central passageway 88, which may extend from a lower surface of the spacer extension 86 to an upper surface of the disk body member 84. The central passageway 88 may be adapted for mating engagement with the central stem 78 of the base member 66 (i.e., in a specific embodiment, the central passageway 88 may have a square or rectangular cross section). The disk body member 84 may also include one or more flow apertures 90 extending from a lower surface of the disk body member 84 to an upper surface of the disk body member 84. In a specific embodiment, the disk body member 84 may include three flow apertures 90. In a specific embodiment, the flow apertures 90 may be offset from or not aligned with the grooves 82 (or flow apertures) in the base member 66. In a specific embodiment, the flow apertures 90 may be positioned approximately equidistant between the grooves 82 (or flow apertures) in the base member 66. In a specific embodiment, the location of the flow apertures 90 relative to the grooves 82 may be fixed by virtue of the geometric relationship between the shape of the central stem 78 on the base member 66 and the shape of the central passageway 88 through the first center disk 68. In the specific embodiment shown, those shapes are square or rectangular. But the scope of the present inventions is not limited to any particular shape, but instead covers any shape or configuration that will prevent relative rotation of the base member 66 and the first center disk 68 when assembled. In another specific embodiment, a fastener (e.g., a screw, bolt, pin, etc.) may be used instead of the central stem 78 to secure the various components together (i.e., the base member 66 may be included without a central stem 78). The purpose of offsetting the flow apertures 90 in the first center disk 68 relative to the grooves 82 (or flow apertures) in the base member 66 is to create a circuitous flow path of pressurized fluid coming from the pipeline through the labyrinth member, as will be further discussed below.

Still referring to the first center disk 68, in a specific embodiment, the lower surface of the disk body member 84 may include a plurality of debris pockets 92 extending partially up into the lower surface of the disk body member 84. The purpose of the debris pockets 92 is to capture and retain debris contained within the pressurized fluid flowing upwardly from the pipeline into the labyrinth member, to thereby prevent it from reaching the first/lower magnet 74. In a specific embodiment, the pockets 92 may be circular in shape, but the present inventions are not limited to any particular shape, as any shape is intended to be covered by the present inventions. Furthermore, instead of pockets 92, other alterations to the structure of the lower surface of the disk body member 84 may be provided for the purpose of trapping solid contaminants and debris, such as machining a spiral into the lower surface, adding a texture to the lower surface, or attaching a fabric material to the lower surface, such as a felt material. As best shown in FIG. 3, when the labyrinth components are assembled (if the labyrinth member is not a unitary structure), the lower surface of the spacer extension 86 rests on top of the upper surface of the base member 66, and creates a flow space 93, such as an annular space, around the spacer extension 86 and between the upper surface of the base member 66 and the lower surface of the disk body member 84. The pressurized fluid coming from the pipeline up into the labyrinth member will flow within the flow space 93 as it is diverted on its circuitous path from the grooves 82 (or flow apertures) in the base member 66 to the flow apertures 90 in the first center disk 68.

Moving up to the next component, the second center disk 70 may be structurally very similar to the first center disk 68, in that the second center disk 70 may include a disk body member 94, a spacer extension 96, a central passageway 98, one or more flow apertures 100, and a plurality of debris pockets 102. The difference is that the flow apertures 100 in the second center disk 70 are offset from the flow apertures 90 in the first center disk 68. This is done for the same purpose as explained above, i.e., to extend the circuitous flow path of pressurized fluid coming from the pipeline. In a specific embodiment, where pockets 102 are included, this may also be done for the purpose of directing fluid flow over the pockets 102 so the pockets 102 can catch and retain debris contained within the pressurized fluid and prevent it from reaching the first/lower magnet 74. Again, as mentioned above, in a specific embodiment, a pipeline passage indicator may be provided without the second center disk 70. Also, as mentioned above, in a specific embodiment, the pipeline passage indicator may be provided with more than two center disks.

Moving up to the next component, the magnet retainer 72 may be structurally similar to the first center disk 68 and the second center disk 70, in that the magnet retainer 72 may include a magnet body member 104, a spacer extension 106, a central passageway 108, and a plurality of debris pockets 110. Instead of flow apertures 90/100, the magnet body member 104 may include grooves 112 such as the grooves 82 in the base member 66. However, all that is needed for each of the base member 66, the first center disk 68, the second center disk 70, and the magnet retainer 72 to have some fluid flow passageway (e.g., an outer groove, a flow aperture, or some other flow path to create a circuitous flow path from a first or lower end of the labyrinth member or assembly to a second or upper end of the labyrinth member or assembly). In a specific embodiment, the magnet body member 104 may include at least one flow aperture instead of grooves 112. Another difference is that the magnet retainer 72 includes a magnet bore 114 (shown in FIG. 3) for holding the first/lower magnet 74. In a specific embodiment, a fastener 116 (e.g., screw, bolt, pin, etc.) may extend through a central bore in the first/lower magnet 74 and into the central bore 80 of the central stem 78 of the base member 66, and threadably engage with the threaded portion of the central bore 80 of the central stem 78, to hold the components of the labyrinth assembly together. The bolt is not necessary if the labyrinth member is a unitary structure. A lower spring 118 is provided to impart a downward force on the labyrinth member. In a specific embodiment, the spring 118 may be partially disposed around the first/lower magnet 74 and between an upper surface of the lower bore 44 and an upper surface of the magnet retainer 72.

Figure 11:
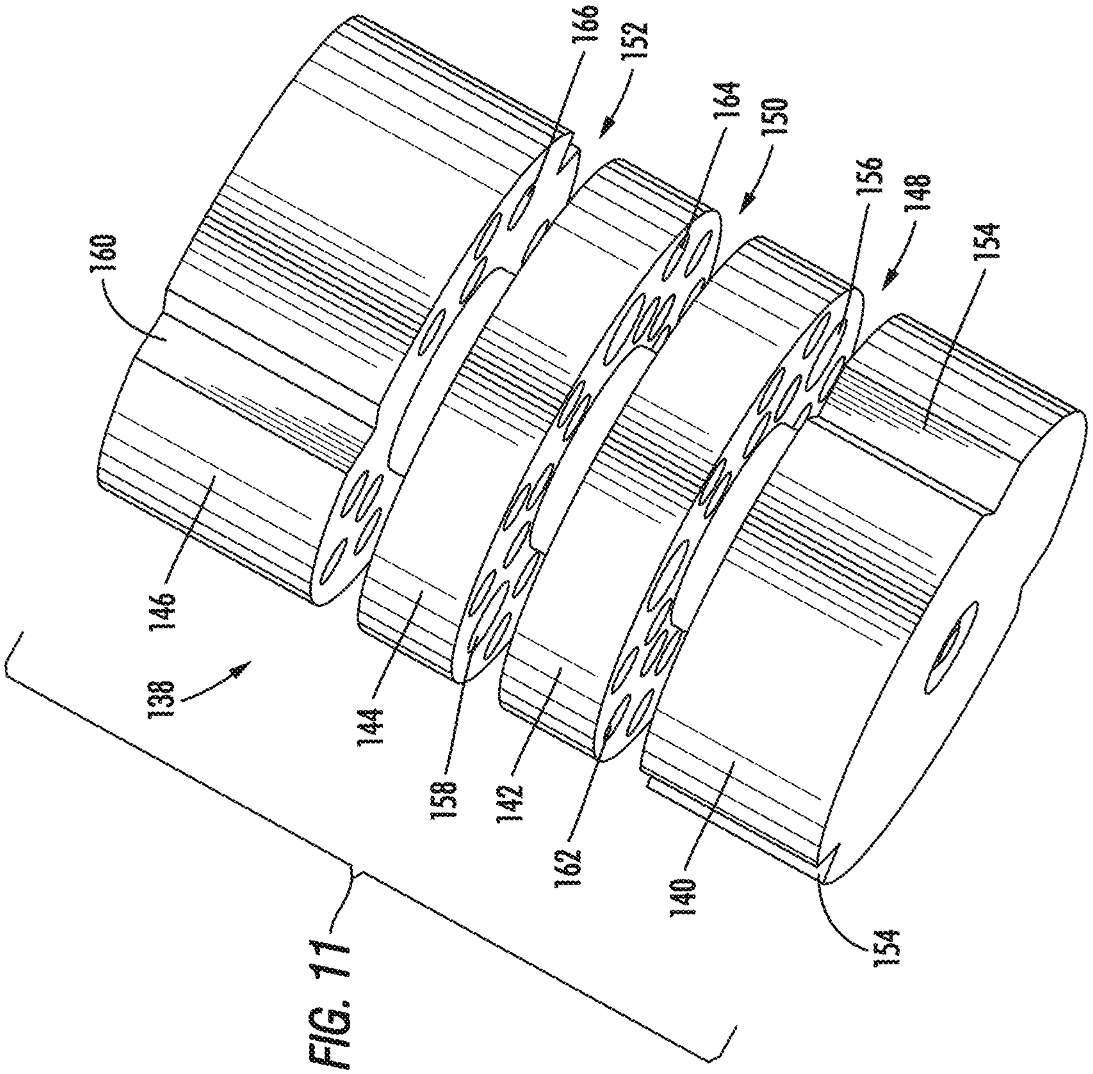
FIG. 11 is a perspective view of a specific embodiment of a unitary labyrinth member in accordance with one aspect of the present inventions.

As explained above, the labyrinth member may be provided as an assembly of separate components that are assembled into a single component, or it may be formed as a unitary structure. In either case, the labyrinth member defines a circuitous flow path from a first or lower end of the labyrinth member to a second or upper end of the labyrinth member. A specific embodiment of a unitary labyrinth member 138 is shown in FIG. 11. Referring now to FIG. 11, if the labyrinth member 138 is a unitary structure, in a specific embodiment, it may include a base section 140, at least one center disk section (such as a first center section 142 or a second center section 144), and a magnet holder section 146, each of which may be separated by flow spaces 148, 150, 152 (which could be between surfaces of those sections that are in contact with one another). In a specific embodiment, a circuitous flow path may extend from the first or lower end of the labyrinth member 138 (such as a lower surface of the base section 140) through a flow path in the base member (such as one or more grooves 154), into the flow space 148 between the base section 140 and the first center disk section 142, through a flow aperture 156 in the first center disk section 142 that is offset from the flow path 154 in the base member, into the flow space 150 between the first center disk section 142 and the second center disk section 144, through a flow aperture 158 that is offset from the flow aperture 156 in the first center disk section 142, into the flow space 152 between the second center disk section 144 and the magnet holder section 146, and through at least one flow path through the magnet holder section (such as a groove 160) that is offset from the flow aperture 158 in the second center disk section 144, and into a space above the second or upper end of the labyrinth member (e.g., an upper surface of the magnet holder section 146). In a specific embodiment, at least one of lower surfaces of the center disk sections 142 and 144 and the magnet holder section 146 may include at least one debris pocket 162, 164, 166 for collecting and housing debris as pressurized fluid flows through the circuitous path. In a specific embodiment, the labyrinth member 138 may include multiple center disk sections, with flow apertures offset from adjacent flow apertures or flow paths. In a specific embodiment, the labyrinth member 138 may not include any center disk sections, in which case the circuitous flow path is defined by a flow path through or around the base section into an offset flow path through or around the magnet holder section 146.

Figure 4:
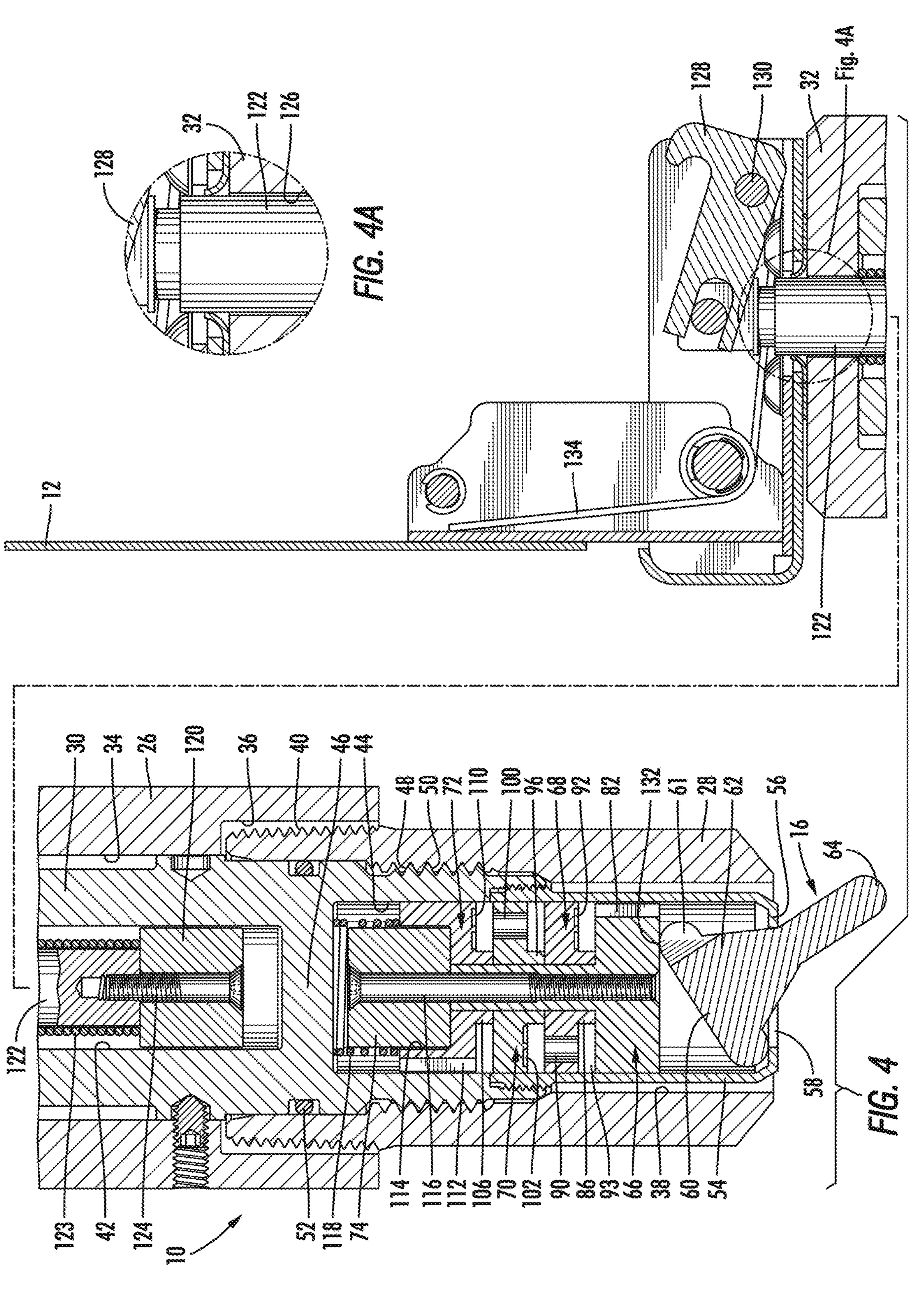
FIG. 4 is a cross-sectional view similar to FIG. 3, but with the pipeline passage indicator now in a second or deployed position, with the trigger in its second or deflected position and the flag indicator in its second or deployed position.

Focusing now on the upper portion of the pipeline passage indicator 10, a second or upper magnet 120 is located in the upper bore 42 of the inner body member 30. An upper magnet extension 122 may be secured to an upper surface of the upper magnet 120, such as with a bolt 124. A spring 123 may be disposed around the upper magnet extension 122 and between a lower surface of the enclosed upper end 32 and an upper end of the upper magnet 120 to urge the upper magnet 120 downwardly within the upper bore 42. An upper end of the upper magnet extension 122 extends through an aperture 126 in the enclosed upper end 32 of the upper housing 26. An upper surface of the upper magnet extension 122 contacts a rocker arm 128, which is rotatably mounted above the enclosed upper end 32 of the upper housing 26 on a pin 130. The rocker arm 128 has a first or non-deployed position as shown in FIG. 3, which corresponds to the first, down, or non-deployed position of the flag 12. The rocker arm 128 has a second or deployed position as shown in FIG. 4, which corresponds to the second, up, or deployed position of the flag 12.

The operation of the specific embodiment of the pipeline passage indicator 10 shown in the Figures and discussed above will now be described. Referring to FIG. 2, the pig 24 is shown approaching and making initial contact with the tip 64 of the trigger 16. At this point, the trigger 16 is in its first or non-deflected position, and the flag 12 is in its first/down/non-deployed position; and, as shown in FIG. 3, the lower magnet 74 and the upper magnet 120 are in their respective first or lower positions. It is also noted that, at this point, the interior space of the pipeline passage indicator 10 that is below the seal 52 is now occupied by and exposed to pressurized fluid from the pipeline. Referring now to FIG. 2A, the pig 24 has now moved past the trigger 16 and deflected the trigger 16 to its second or deflected position, as shown in FIG. 4. With reference to FIG. 4, when the trigger 16 is moved into its second or deflected position, an upper right corner 132 of the trigger head 60 will come into contact with and upwardly push a lower surface of the base member 66. This will push the lower magnet 74 upwardly toward the inner wall 46, and into sufficiently close proximity to the upper magnet 120 to push the upper magnet upwardly. This is due to the like polarities of the lower magnet 74 and the upper magnet 120. This will push the upper magnet extension 122 upwardly to cause the rocker arm 128 to rotate upwardly around pin 130. This will disengage the rocker arm 128 from a flag assembly that includes a spring 134 that will push the flag 12 into its second, up or deployed position, as shown in FIGS. 2A and 4.

From the above discussion and descriptions of the present inventions, it can be seen that the present inventions provide improved pipeline passage indicators that provide improved isolation of the lower magnet 74 from contaminants and debris contained within the pressurized fluid in the pipeline. This is accomplished by providing a circuitous flow path through a labyrinth or maze so that debris and contaminants in the pressurized fluid to which the lower magnet 74 is exposed is minimized. In this manner, the degree to which the lower magnet 74 is fouled by or covered with debris is minimized, which thereby extends the effective life of the lower magnet 74 to perform its function of pushing the upper magnet 120 up to release the flag 12, as discussed above. This can further be enhanced by positioning one or more debris pockets 92/102/110 along the circuitous pass to filter out and house debris within the pressurized fluid.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A pipeline passage indicator comprising:

a body member including an upper internal bore and a lower internal bore;

a flag attached to an upper end of the body member and moveable between a first position and a second position;

an upper magnet disposed within the upper internal bore for movement between a first position and a second position;

a lower magnet disposed within the lower internal bore for movement between a first position and a second position;

a labyrinth member defining a circuitous flow path from a first end of the labyrinth member to a second end of the labyrinth member, and moveable between a first position and a second position, the labyrinth member including a center disk, the center disk including at least one pocket in a lower surface of the center disk; and a trigger disposed adjacent the first end of the labyrinth member and moveable between a first position and a second position.

2. The pipeline passage indicator of claim 1, wherein the labyrinth member includes a base member and a magnet holder, the lower magnet being at least partially positioned in a magnet bore in the magnet holder.

3. The pipeline passage indicator of claim 2, wherein the base member includes a support plate and a central stem, and the center disk includes a disk body member and a spacer extension extending from the disk body member, the spacer extension having a lower surface in contact with an upper surface of the support plate to define a flow space.

4. The pipeline passage indicator of claim 3, wherein the disk body member includes at least one flow aperture therethrough.

5. The pipeline passage indicator of claim 2, wherein the magnet holder includes a magnet body member, a lower surface of the magnet body member including at least one pocket disposed therein.

6. The pipeline passage indicator of claim 2, wherein the center disk includes a central passageway extending therethrough, and the magnet holder includes a central passageway extending therethrough, the central stem mating with and extending through the central passageway in the center disk and the central passageway in the magnet holder.

7. The pipeline passage indicator of claim 2, wherein the base member includes a support plate having an outer surface, the outer surface of the support plate including at least one groove, the center disk having a disk body member, the disk body member including at least one flow aperture therethrough, the at least one flow aperture being offset from the at least one groove.

8. A pipeline passage indicator comprising:

a body member including an upper internal bore, a lower internal bore, and an internal wall, the internal wall being disposed between the upper internal bore and the lower internal bore;

a flag attached to an upper end of the body member and moveable between a first position and a second position;

an upper magnet disposed within the upper internal bore for movement between a first position and a second position;

a lower magnet disposed within the lower internal bore for movement between a first position and a second position;

a base member disposed in the lower internal bore and including a central stem and a flow path;

a center disk disposed in the lower internal bore, engaged with the central stem on the base member, and having a flow aperture offset from the flow path in the base member and at least one pocket disposed in a lower surface of the center disk;

a magnet holder disposed in the lower internal bore and engaged with the central stem on the base member, the lower magnet being at least partially positioned in a magnet bore in the magnet holder, the magnet holder including a flow path offset from the flow aperture in the center disk; and a trigger disposed adjacent the base member, and moveable between a first position and a second position.

9. The pipeline passage indicator of claim 8, wherein the base member further includes a support plate, and the center disk includes a disk body member and a spacer extension extending from the disk body member, the spacer extension having a lower surface in contact with an upper surface of the support plate to define a flow space.

10. The pipeline passage indicator of claim 8, wherein the magnet holder includes a magnet body member, a lower surface of the magnet body member including at least one pocket disposed therein.

11. The pipeline passage indicator of claim 8, wherein the center disk includes a central passageway extending therethrough, and the magnet holder includes a central passageway extending therethrough, the central stem on the base member mating with and extending through the central passageway in the center disk and the central passageway in the magnet holder.

12. The pipeline passage indicator of claim 8, wherein the base member includes a support plate having an outer surface, the outer surface of the support plate including at least one groove, the center disk having a disk body member, the disk body member including at least one flow aperture therethrough, the at least one flow aperture being offset from the at least one groove.

13. A pipeline passage indicator comprising:

a body member including an upper internal bore, a lower internal bore, and an internal wall, the internal wall being disposed between the upper internal bore and the lower internal bore;

a flag attached to an upper end of the body member and moveable between a first position and a second position;

an upper magnet disposed within the upper internal bore for movement between a first position and a second position;

a lower magnet disposed within the lower internal bore for movement between a first position and a second position;

a base member disposed in the lower internal bore and including a central stem and a support plate, the support plate having an outer surface, the outer surface on the support plate including at least one groove;

a center disk disposed in the lower internal bore, engaged with the central stem on the base member, and having at least one flow aperture therethrough and at least one pocket disposed in a lower surface of the center disk, the at least one flow aperture being offset from the at least one groove in the outer surface of the support plate;

a magnet holder disposed in the lower internal bore and including a magnet body member and engaged with the central stem on the base member, the magnet body member having an outer surface including at least one groove, the at least one groove being offset from the at least one aperture in the center disk, the lower magnet being at least partially positioned in a magnet bore in the magnet body member; and a trigger disposed adjacent the base member, and moveable between a first position and a second position.

14. The pipeline passage indicator of claim 13, wherein the center disk includes a disk body member and a spacer extension extending from the disk body member, the spacer extension having a lower surface in contact with an upper surface of the support plate of the base member to define a flow space between the base member and the center disk.

15. The pipeline passage indicator of claim 13, wherein a lower surface of the magnet body member includes at least one pocket disposed therein.

16. The pipeline passage indicator of claim 13, wherein the center disk includes a central passageway extending therethrough, and the magnet holder includes a central passageway extending therethrough, the central stem on the base member mating with and extending through the central passageway in the center disk and the central passageway in the magnet holder, and the base member, center disk, and magnet holder are connected to each other.

17. The pipeline passage indicator of claim 16, wherein the central stem on the base member has a square cross section, the central passageway of the center disk has square cross section configured to matingly engage with the central stem, and the central passageway of the magnet holder has a square cross section configured to matingly engage with the central stem.

* * * * *